(12) United States Patent
Lemieux

(10) Patent No.: US 6,452,904 B1
(45) Date of Patent: Sep. 17, 2002

(54) OPERATION AND MAINTENANCE FLOW SUPPORT FOR A-INTERFACE CONNECTIONS

(75) Inventor: Yves Lemieux, Kirkland (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/232,408

(22) Filed: Jan. 15, 1999

(51) Int. Cl.[7] .............................. H04J 1/16; H04J 3/14
(52) U.S. Cl. ................. 370/236; 370/310.2; 370/395.6; 370/469
(58) Field of Search .............................. 370/310, 310.1, 370/310.2, 328, 338, 349, 395.1, 396, 395.5, 410, 469, 360, 395.6, 236.2, 252, 236, 426, 465, 466, 467

(56) References Cited

U.S. PATENT DOCUMENTS

| | | | |
|---|---|---|---|
| 5,818,824 A | * 10/1998 | Lu et al. ...................... 370/328 |
| 5,878,343 A | * 3/1999 | Robert et al. ................ 455/424 |
| 6,049,543 A | * 4/2000 | Sauer et al. ................. 370/395 |
| 6,097,817 A | * 8/2000 | Bilgic et al. ................. 380/247 |
| 6,128,505 A | * 10/2000 | Sipila .......................... 455/465 |
| 6,205,157 B1 | * 3/2001 | Galyas et al. ............... 370/503 |
| 6,208,627 B1 | * 3/2001 | Menon et al. ............... 370/328 |

FOREIGN PATENT DOCUMENTS

| | | |
|---|---|---|
| EP | 0 818 939 A2 | 1/1998 |
| WO | WO 98 51119 | 11/1998 |

OTHER PUBLICATIONS

International Search Report PCT/SE 99/02409, dated Jun. 20, 2000.
Gillespie et al.. "Evolving Access Networks: A European Perspective", IEEE Communications Magazine, vol. 353, Mar. 1997, pp. 47–54.
Armbruster, et al., "Switch Architecture Evolution in SONET Networks", SuperComm/ICC '90, vol. 2, 1990, pp. 552–556.
*B–ISDN ATM Adaptation Layer Type 2 Specification*; author unknown; Annex D to Draft Recommendation I.363.2 (Q.6/SG13 Madrid Report); Madrid, Nov. 1996.

* cited by examiner

*Primary Examiner*—Ajit Patel
(74) *Attorney, Agent, or Firm*—Jenkens & Gilchrist

(57) ABSTRACT

With respect to an A-interface within a cellular network, the flow of operation and maintenance information between network layer end-points of the network in connection with A-interface signaling transmissions (DS0 or AAL) over the A1 and A4 sub-interfaces is carried by an F6 OAM flow. Similarly, the flow of operation and maintenance information between network layer end-points of the network in connection with A-interface traffic transmissions (DS0 or AAL) over the A2 and A3 sub-interface is carried by an F7 OAM flow.

9 Claims, 3 Drawing Sheets

OPERATION AND MAINTENANCE FLOW SUPPORT FOR A-INTERFACE CONNECTIONS

BACKGROUND OF THE INVENTION

1. Technical Field of the Invention

The present invention relates to operation and maintenance (OAM) activities within a cellular communications network and, in particular, to the specification of OAM flows for A-interface connections.

2. Description of Related Art

Reference is now made to FIG. 1 wherein there is shown a schematic diagram of a cellular telephone network 10 including a plurality of interconnected switching nodes (SN) 12. Although only two switching nodes 12 are shown, it will be understood that the network 10 likely includes many more interconnected nodes. The first and second switching nodes 12(1) and 12(2) may comprise any one of a number of known telecommunications switching devices, including mobile switching centers (MSC's), as commonly used and known in the art for providing either digital or analog cellular telephone service to a plurality of mobile stations (MS) 14. The switching nodes 12 are interconnected with each other for communication via both voice trunks 18 (illustrated with broken lines) and signaling links 16 (illustrated with solid lines) providing a known ISUP (or R1 or R2) type connection. The voice trunks 18 provide voice and data communications paths used to carry subscriber communications between the switching nodes 12. The signaling links 16 carry command signals between the switching nodes 12. These signals may be used, for example, in setting up and tearing down voice and data communications links over the voice trunks 18 and controlling the provision of calling services to the mobile stations 14. The switching nodes 12 are also connected to a data base 20 comprising a home location register (HLR) by means of signaling links 22 providing a known Mobile Application Part (MAP) or IS-41 type connection. The data base 20 stores information concerning the mobile stations 14 comprising location information and service information.

Each of the switching nodes 12 is further connected to at least one associated concentration point (CP) 24 via both a signaling link 26 and a voice trunk 28. The voice trunk 28 provides a voice and data communications path used to carry subscriber communications between each switching node 12 and its associated one or more concentration points 24. The signaling link 26 carries command signals between the node 12 and its associated concentration point 24. The signaling link 26 and trunk 28 are collectively commonly referred to in the art as the "A interface". Each concentration point 24 is then connected to a plurality of base stations (BS) 30 which operate to effectuate radio frequency communications with proximately located mobile stations 14 over an air interface 32.

As a basic functionality, each concentration point 24 performs necessary switching operations to route communications (traffic or control) between the signaling link 26 and trunk 28 and the base stations 30. As an enhanced functionality, each concentration point 24 may further perform radio network control (RNC) operations (such as mobile station locating, radio frequency channel allocation, handoff control, and local mobile station to mobile station call set-up) in a well known manner to control mobile radio frequency communications operation. When both the basic and enhanced functionalities are present, the concentration point 24 is referred to in the art as a base station controller (BSC). When both functionalities are not present, typically the concentration point 24 routes, and the switching nodes 12 implement the radio network controller operations.

The concentration points 24 may also be interconnected with each other via both a signaling link 34 and a voice trunk 36. The voice trunk 36 provides a voice and data communications path used to carry subscriber communications between the concentration points 24. The signaling link 34 carries command signals between the concentration points 24. The signaling link 34 and trunk 36, when present, are included within the "A interface". These connections are advantageously utilized in certain situations (such as at intra-switching node handoff or mobile station to mobile station call set-up) to by-pass the switching node 12 and more efficiently support the provision of cellular service to the mobile stations.

Although direct communications links (signaling and/or trunk) are illustrated in FIG. 1, it is understood by those skilled in the art that the links are not necessarily direct between the illustrated nodes, and may instead pass through many other communications nodes (not shown) of the mobile network, and perhaps even utilize other communications networks (such as the public switched telephone network—PSTN). Illustration of the links in the "virtual" manner shown in FIG. 1 is therefore by way of simplification of the drawing. The cellular telephone network 10 may comprise a Global System for Mobile (GSM) communications, an Advanced Mobile Phone System (AMPS), a digital Advanced Mobile Phone System (D-AMPS), a code division multiple access (CDMA) system, or the like.

Prior to the definition of the A-interface, the connection between the switching node 12 and concentration point 24 was proprietary and vendor specific. This forced a cellular service operator/provider to purchase all the equipment from the same source. The premise behind the development of the A-interface concept is to support a multi-vendor environment for cellular network equipment. With the specification of a standardized interface between the switching nodes 12 and the concentration points 24, a cellular service operator/provider could purchase its needed equipment from different vendors and easily interconnect that equipment.

The Telecom Industry Association (TIA) sub-committee TR45.4 is currently finalizing a definition for the A-interface (see, Interim Standard IS-634, rev. A). This standard describes the overall system functions between the switching nodes 12 and the concentration points 24 relating to the services and features required for the interface.

The A-interface includes a plurality of sub-interfaces. A first sub-interface (A1) carries signaling (see, signaling link 26) through the concentration point 24 between a call control (CC) function and mobility management (MM) function within the switching node 12 and the call control (CC) component of the base station 30. The A1 sub-interface supports short message service (SMS) messaging and over the air activation service provisioning (OTASP) using OTA data messages as defined in Interim Standard IS-683 sections 3.5 and 4.5. A second sub-interface (A2) carries 64 kbit/sec pulse code modulation (PCM) information (voice/data) over the trunk 28 between the switch component of the switching node 12 and either the channel element component of the base station 30 (for an analog air interface) or the selection/distribution unit (SDU) of the base station 30 (for a digital air interface). A third sub-interface (A3) carries coded user information (voice/data) frames and signaling between the selection/distribution unit (SDU) and the channel element component of the base station 30. The A3 sub-interface is composed of two parts: a signaling connection; and a user traffic connection. The signaling connection is carried across a separate logical path from the user traffic connection and controls the allocation and use of the logical paths for user traffic connections. A fourth sub-interface (A4) carries signaling between the call control component (CC) and the selection/distribution unit (SDU) of the base station 30. The A3 sub-interface is utilized to carry traffic between two concentration points 24 over the trunk 36. The A4 sub-interface is utilized to carry signaling between two concentration points 24 over the signaling link 34. A fifth sub-interface (A5) carries a full duplex stream of bytes between the inter-working function (IWF) of the switching node 12 and the selection/distribution unit (SDU) of the base station 30.

One important aspect of network operation that is not well defined by IS-634 rev. A is the provision of operation and maintenance (OAM) flows for user data and signaling over the A-interface. More particularly, there is a need for an OAM flow support for transport optimization and improved application support over the A1, A2, A3 and A4 sub-interfaces.

Reference is now made to FIG. 2 wherein there is shown a block diagram for a synchronous optical network (SONET) 60 providing the transport layer (physical) of an OSI seven layer model for communications systems. The SONET 60 includes a plurality of repeaters 62. The flow of operation and maintenance information between repeaters 62 in the SONET 60 is referred to in the art as an F1 OAM flow 64. The F1 OAM flow is the smallest recognizable physical entity for OAM information transmission. When a number of repeaters 62 are collected together to define a transmission path, this forms a section 66. The flow of operation and maintenance information between end-point repeaters 62 for a section 66 in the SONET 60 is referred to in the art as an F2 OAM flow 68. When a number of sections 66 are collected together to define a transmission path, this forms an end-to-end system 70. The flow of operation and maintenance information between end-points 72 of the system 70 in the SONET 60 is referred to in the art as an F3 OAM flow 74.

Reference is now made to FIG. 3 wherein there is shown a block diagram for an asynchronous transport mode (ATM) network 80 (which may, for example, run over SONET 60 as in FIG. 2). In this configuration, ATM comprises the data link layer of the OSI seven layer model for communications systems. The flow of operation and maintenance information between end-points 78 of an ATM network 80 in connection with a virtual path (VP) 82 is referred to in the art as an F4 OAM flow 84. Similarly, the flow of operation and maintenance information between end-points 78 of an ATM network 80 in connection with a virtual circuit (VC) 86 is referred to in the art as an F5 OAM flow 88.

There may occur instances where OAM functionalities are required at the ATM adaptation layer (AAL), which comprises the network layer of the OSI seven layer model for communications systems. This OAM functionality can be supported by the existing F4 OAM flow 84 and F5 OAM flow 88 if the ATM connection (with the AAL packets) is terminated at the same end-points 78 of the ATM network 80 using either the virtual path 82 or virtual circuit 86. When, for example, a number of end-to-end SONET systems 70 are collected together to define a transmission path and form an end-to-end ATM network 80, AAL packets may be relayed (multiplexed/demultiplexed) at SONET end-points 72 to different locations. In this configuration, the existing F4 OAM flow 84 and F5 OAM flow 88 cannot support an end-to-end OAM functionality, and thus cannot be used. There is a need then in the art for a new type of OAM flow for use in connection with providing an end-to-end OAM functionality for AAL packet transmissions (traffic/signaling) within an end-to-end ATM network 80.

With additional reference now once again to FIG. 1, another concern arises with respect to OAM flow support over the A-interface. Again, OAM functionality can be supported by the existing F4 OAM flow 84 and F5 OAM flow 88 if the ATM connection (with the AAL packets) is terminated at the same A-interface end-points 78 using either the virtual path 82 or virtual circuit 86, and assuming that ATM is supported for use on each of the A1–A4 sub-interfaces. This is not necessarily the case, however, as the current IS-634 rev. A proposal specifies ATM for use only on the A3 and A4 sub-interfaces. The A1 and A2 sub-interfaces conversely utilize a 64 kits/sec digital signal level O (DSO) based transport which cannot support either an F4 OAM flow 84 or an F5 OAM flow 88 as currently defined. Thus, there is a need in the art for a new type of OAM flow for use in connection with providing an end-to-end OAM functionality for transmissions (traffic/signaling) over the A-interface with respect to DSO base transports.

SUMMARY OF THE INVENTION

To address the foregoing needs, the present invention defines a pair of new OAM flows for use in connection with providing an end-to-end OAM functionality for transmissions (traffic/signaling) of the A-interface within an end-to-end network. The flow of operation and maintenance information between network layer end-points of the network in connection with A-interface signaling transmissions (DSO or AAL) comprises an F6 OAM flow. In connection with A-interface operation, this F6 OAM flow is utilized for OAM functionality over the A1 and A4 sub-interfaces. Similarly, the flow of operation and maintenance information between network layer end-points of the network in connection with traffic transmissions (DSO or AAL) comprises an F7 OAM flow. In connection with A-interface operation, this F7 OAM flow is utilized for OAM functionality over the A2 and A3 sub-interfaces.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 4:
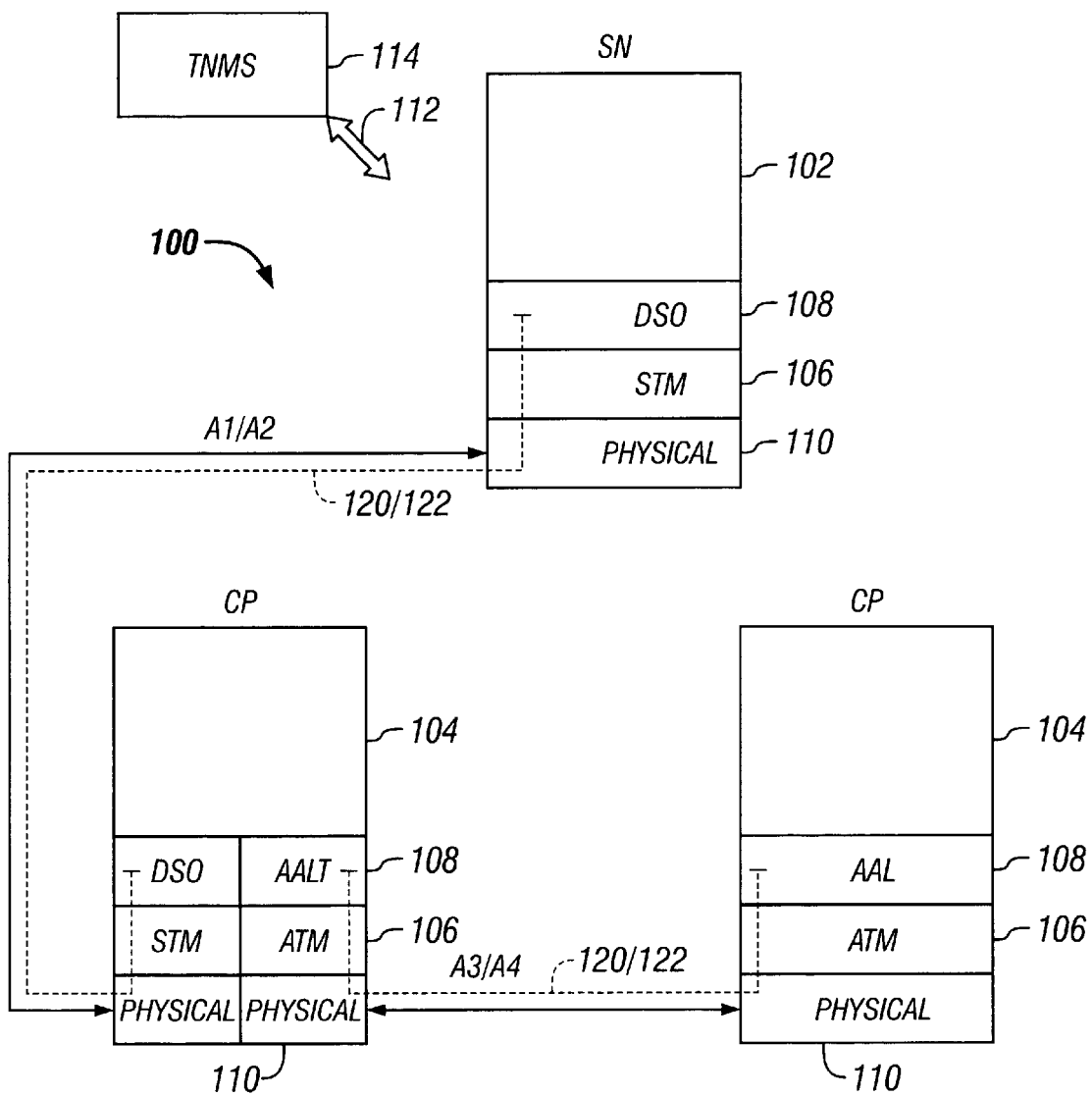
FIG. 4 is a block diagram of an A-interface implementing an OAM functionality in accordance with the present invention.

Reference is now made to FIG. 4 wherein there is shown a block diagram of an A-interface 100 implementing a digital signal level O (DSO) and an ATM adaptation layer (AAL) OAM functionality in accordance with the present invention. The A-interface 100 extends between a switching node 102 and a concentration point 104 utilizing an A1 and A2 type sub-interface. The A-interface further extends between two concentration points 104 utilizing an A3 and A4 type sub-interface. The switching node 102 comprises an OSI seven layer model communications node specifying synchronous transport mode (STM) as the data link layer 106 and specifying for traffic and signaling communications the use of digital signal level O (DSO) as the network layer 108. Similarly, the concentration point 104 comprises an OSI seven layer model communications node specifying on a first part thereof: synchronous transport mode (STM) as the data link layer 106 and the use of digital signal level O (DSO) as the network layer 108 for traffic and signaling communications, and specifying on a second part thereof: asynchronous transport mode (ATM) as the data link layer 106 and the use of ATM adaptation layer (AAL) as the network layer 108 for traffic and signaling communications. The physical layer 110 of the OSI seven layer model utilized to interconnect the switching node 102 and one or more concentration points 104 over the A-interface 100 may comprise any suitable physical transport including, for example, a T1 connection, an unshielded twisted pair (UTP), and fiber. Although not specifically illustrated, it will be understood that the A1–A2 sub-interface connections between the switching node 102 and a concentration point 104 may pass through one or more repeaters, and further that the A3-A4 sub-interface connections between concentration points 104 may also pass through one or more repeaters. More specifically, the A-interface between the switching node 102 and the concentration point 104 may be carried over a T1 connection, and the A-interface between the two concentration points 104 may be carried over a plurality of end-to-end synchronous optical network (SONET) systems connected together. The switching node 102 is connected (in a manner generally indicated at 112) to a transport network management system (TNMS) 114 to send and receive operation and maintenance (OAM) information using appropriate flows as will be described.

Utilizing the data link layer 106 ATM functionality, a number of virtual path and virtual circuit connections may be established between the concentration points 104. Operation and maintenance related information concerning these virtual path and virtual circuit connections is carried in connection with each virtual path using an F4 OAM flow and is carried in connection with each virtual circuit using an F5 OAM flow. Due to the concerns and limitations discussed above, these F4 and F5 OAM flows may not be able to support OAM functionality with respect to the operation of the AAL network layer 108.

In accordance with the present invention, the flow of operation and maintenance information between network layer 108 end-points of the A-interface 100 in connection with AAL signaling transmissions (i.e., between the concentration points 104) is handled with an F6 OAM flow 120. Further in accordance with the present invention, the flow of operation and maintenance information between network layer 108 end-points of the A-interface 100 in connection with DSO signaling transmissions (i.e., between the switching node 102 and the concentration point 104) is also handled with an F6 OAM flow 120. Thus, this F6 OAM flow 120 is utilized for A-interface OAM functionality specifically over the A1 and A4 sub-interfaces. An advantage of this F6 OAM flow is that the need for duplicate signaling system no. 7 (SS7) paths for signaling communications is obviated. The F6 OAM flow, and the information carried over is, as well as the network access and control feature provided to the TNMS, may be used to ensure the availability of a path for signaling communications.

Similarly, the flow of operation and maintenance information between network layer 108 end-points of the A-interface 100 in connection with AAL traffic transmissions (i.e., between the concentration points 104) is handled with an F7 OAM flow 122. Further in accordance with the present invention, the flow of operation and maintenance information between network layer 108 end-points of the A-interface 100 in connection with DSO traffic transmissions (i.e., between the switching node 102 and the concentration point 104) is also handled with an F7 OAM flow 122. Thus, this F7 OAM flow 122 is utilized for A-interface OAM functionality specifically over the A2 and A3 sub-interfaces. An advantage of this F7 OAM flow is the access negotiation part (ANP) data, which is used to obtain AAL type 2 (AAL2) traffic, is always available within the network.

Figure 1:
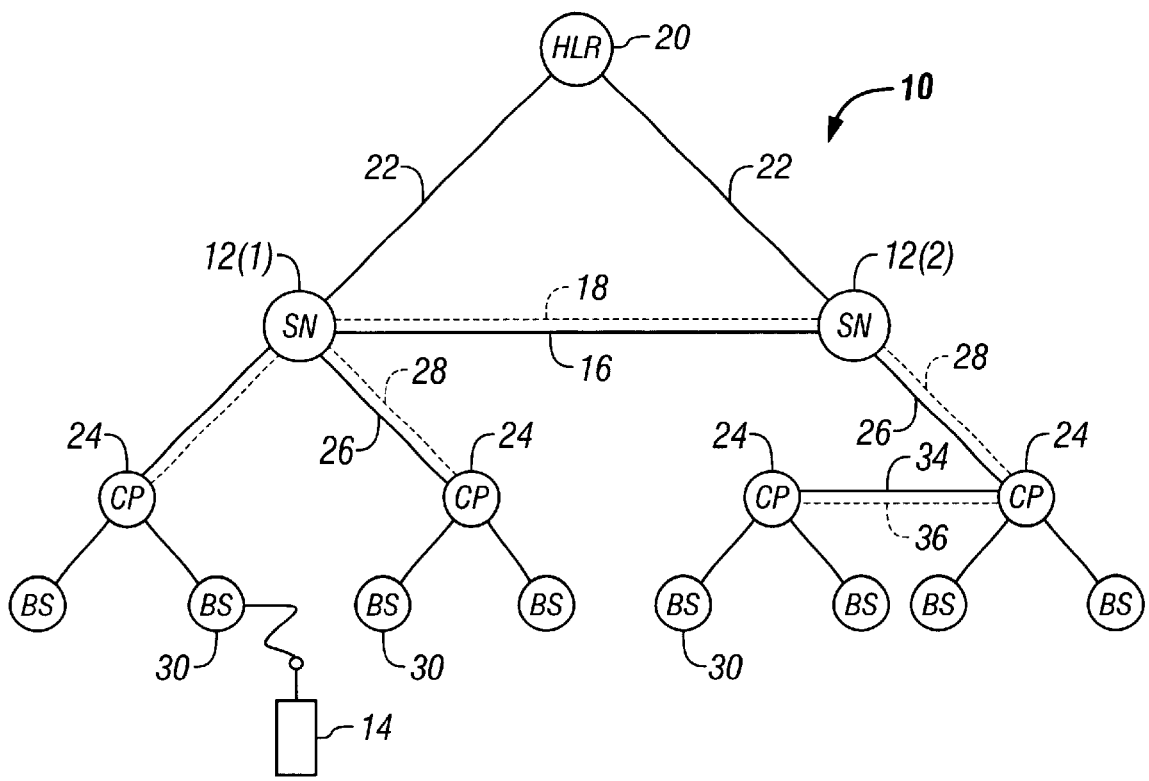
FIG. 1, previously described, is a schematic diagram of a cellular telephone network.
Figure 2:
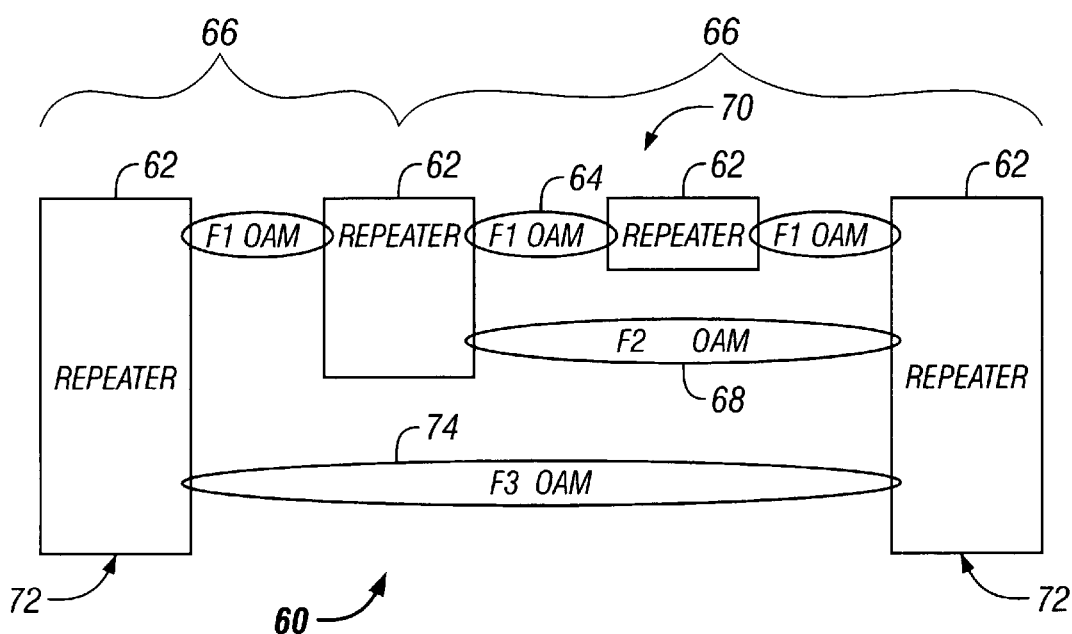
FIG. 2, previously described, is a block diagram for a synchronous optical network (SONET)
Figure 3:
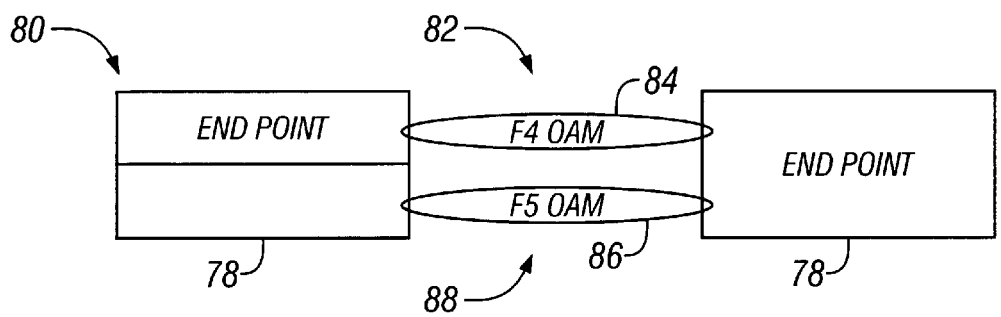
FIG. 3, previously described, is a block diagram for an asynchronous transport mode (ATM) network running over SONET.
Figure 5:
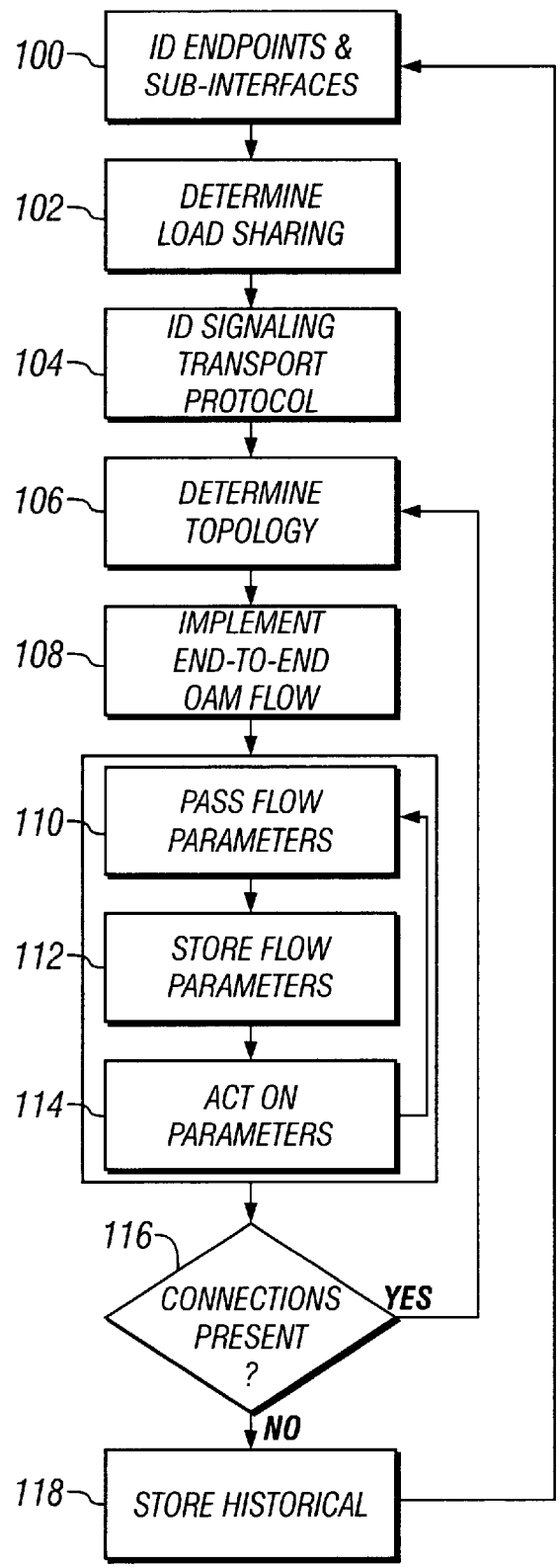
FIG. 5 is a flow diagram illustrating a process for F6 and F7 OAM flow management.

Reference is now made to FIG. 5 wherein there is shown a flow diagram illustrating a process for F6 and F7 OAM flow management. In step 100, an identification is made of both the end points of the A-interface and the sub-interfaces implicated at each end point. For example, end points at the switching node 12 and concentration point 24 in FIG. 1 are identified, with a corresponding identification of the Al and A2 sub-interfaces connected between those end points. Similar identifications may be made at other locations in FIG. 1 with respect to the A-interface. Next, in step 102, signaling routing tables for the network are utilized to determine if load sharing is enabled over any duplicated links between end points. With this determination, an identification may be made as to whether either one or two paths are being utilized between any two step 100 identified end points. In step 104, an identification is made of the signaling transport protocol(s) being used at each end point. For example, in FIG. 4, an identification would be made concerning the use of DSO and AAL. Once the protocol(s) is (are) identified, a determination may be made as to the addressing schemes to be used for identifying the end points. As an alternative, from a known addressing scheme the process of step 104 may instead identify the protocol(s). Next, in step 106, a determination is made of the current network topology being used for the A-interface connections between end points. As examples, the topology may comprise multicast (point to multi-point), star, or tandem (series or daisy chain). In step 108, the process then utilizes the information collected in steps 100, 102, 104 and 106, to implement an end-to-end OAM communication path over the A-interface. More specifically, the action of step 108 establishes an F6 OAM flow (120, FIG. 4) among and between the switching node 102 and one or more concentration points 104 with respect to the A1 and A4 sub-interfaces. Additionally, the action of step 108 establishes an F7 OAM flow (122, FIG. 4) among and between the switching node 102 and one or more concentration points 104 with respect to the A2 and A3 sub-interfaces. In step 110, F6/F7 OAM flow parameters are passed over the F6 OAM flow 120 and F7 OAM flow 122 between the transport network management system and the end points through and over the A-interface. The transport network management system stores the communicated F6/F7 OAM flow parameters in its counters (such as the known counters #1, #2 and #3) in step 112, and acts on the information stored in those counters in step 114 to control network operation. The stored flow parameters may comprise, for example, values representing network performance such as bit error rate, error containing seconds, and block error rate. The sub-process of steps 110, 112 and 114 is repeated as needed to collect OAM information and control network operation. In step 116, a determination is made as to whether all noted connections (traffic or control and signaling) present in a prior time period are still established. If so, the process returns to step 106 where network topology is again examined. This re-check of topology is necessary as hand-off or control issues may have produced a change in topology. If no in step 116, historical data is stored, the TNMS counters are reset, and the process returns in step 118 back to step 100.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A cellular communications network, comprising:

a switching node comprising an OSI seven layer model communications node specifying synchronous transport mode for its data link layer and the use of Digital Signal level O (DSO) for its network layer;

a first concentration point also comprising an OSI seven layer model communications node specifying synchronous transport mode and Asynchronous Transport Mode (ATM) for its data link layer and the use of digital signal level O (DSO) and of ATM adaptation layer (AAL) for its network layer;

a second concentration point also comprising an OSI seven layer model communications node ATM as its data link layer and the use of ATM adaptation layer as its network layer, a plurality of end-to-end synchronous optical network (SONET) systems connected together and interconnecting the first and second concentration points;

an A-interface connection between the switching node and each one of the first and second concentration points, wherein the A-interface comprises an A1 and an A2 sub-interface, wherein the A1 sub-interface supports a first operation and maintenance flow of performance monitoring parameters concerning DSO signaling communications over the A-interface end-to-end between the switching node and the first and second concentration points, and further wherein the A2 sub-interface supports a second operation and maintenance flow of performance monitoring parameters concerning DS traffic communications over the A-interface end-to-end between the switching node and the first and second concentration points, and wherein the A-interface connection further extends between the first and second concentration points and further comprises an A3 and an A4 sub-interface, wherein the A4 sub-interface supports the first operation and maintenance flow of performance monitoring parameters concerning AAL signaling communications over the A-interface end-to-end between the first and second concentration points, and further wherein the A3 sub-interface supports the second operation and maintenance flow of performance monitoring parameters concerning AAL traffic communications over the A-interface end-to-end between the first and second concentration points.

2. The network as in claim 1 further including:

a transport network management system for communicating operation and maintenance data with the switching node and the concentration points over the A-interface using the first and second operation and maintenance flows.

3. A method for establishing operation and maintenance (OAM) flows, comprising the steps of:

(a) identifying end points of an A-interface and sub-interfaces implicated at each end point;

(b) determining if load sharing is enabled over any duplicated links between end points;

(c) identifying each signaling transport protocol in use at each end point;

(d) determining a current network topology being used for the A-interface connections between end points; and (e) utilizing the information collected in steps (a)-(d) implement an end-to-end OAM communication path over the A-interface.

4. The method as in claim 3 wherein step (e) comprises the step of establishing an OAM flow between end points comprising a switching node and a concentration point with respect to an A1 sub-interface to carry performance monitoring OAM parameters concerning digital signal level O (DSO) signaling communications end-to-end between the switching node and the concentration point.

5. The method as in claim 3 wherein step (e) comprises the step of establishing an OAM flow between end points comprising a switching node and a concentration point with respect to an A2 sub-interface to carry performance monitoring OAM parameters concerning digital signal level O (DSO) traffic communications end-to-end between the switching node and the concentration point.

6. The method as in claim 3 wherein step (e) comprises the step of establishing an OAM flow between end points comprising a first concentration point and a second concentration point with respect to an A3 sub-interface to carry performance monitoring OAM parameters concerning ATM adaptation layer (AAL) traffic communications end-to-end between the first and second concentration points.

7. The method as in claim 3 wherein step (e) comprises the step of establishing an OAM flow between end points comprising a first concentration point and a second concentration point with respect to an A4 sub-interface to carry performance monitoring OAM parameters concerning ATM adaptation layer (AAL) signaling communications end-to-end between the first and second concentration points.

8. The method as in claim 3 further including the steps of:

(f) determining whether all noted A-interface connections present in a prior time period are still established; and either (g) if yes, returning to step (d) and repeating the process; or (h) if no, returning to step (a) and repeating the process.

9. A communications network, comprising:

a first communications node specifying the use of ATM adaptation layer (AAL) for its network layer;

a second communications node also specifying the use of ATM adaptation layer for its network layer;

a plurality of end-to-end synchronous optical network (SONET) systems connected together and interconnecting the first and second communications nodes; and an interface connection between the first and second communications nodes supporting a signaling interface and a traffic interface, wherein the signaling interface supports communication of both signaling data and a first operation and maintenance flow of performance monitoring parameters concerning AAL signaling communications end-to-end between the first and second communications nodes, and further wherein the traffic interface supports communication of both traffic data and a second operation and maintenance flow of performance monitoring parameters concerning AAL traffic communications end-to-end between the first and second communications nodes.

* * * * *